United States Patent [19]
Berghof

[11] 3,905,234
[45] Sept. 16, 1975

[54] UNDERWATER WELDING TEST CHAMBER
[75] Inventor: Ernest H. Berghof, Orlando, Fla.
[73] Assignee: Anna Welding Corporation, Orlando, Fla.
[22] Filed: Aug. 9, 1974
[21] Appl. No.: 496,201

[52] U.S. Cl. .............................................. 73/432 SD
[51] Int. Cl.² ........................................ G01M 19/00
[58] Field of Search ............... 73/432 R, 432 SD, 37

[56] References Cited
UNITED STATES PATENTS
2,917,927  12/1959  Clark .............................. 73/432 SD
3,817,109  6/1974  Audet et al. ..................... 73/432 SD FOREIGN PATENTS OR APPLICATIONS
1,094,016  1/1960  Germany ........................ 73/432 SD Primary Examiner—S. Clement Swisher
Attorney, Agent, or Firm—Mortenson & Weigel

[57] ABSTRACT

The apparatus described is capable of testing various attributes of a small, handheld welding chamber for use in underwater welding. Specifically, the apparatus includes two interconnected chambers, one being elevated above the other. Within the lower chamber there is a platen on which is positioned a workpiece to be welded. The welding chamber, a tubular welding housing having a side aperture through which the welding gun may be introduced, is positioned radially within the lower chamber with its axis directed to the workpiece. Shielding gas supplied through an inlet to the housing purges the housing of water and escapes into the lower chamber and from there to the upper chamber. By controlling the exhaust flow from the upper chamber, the water pressure in the lower chamber may be adjusted to any desired value thereby duplicating underwater welding conditions. A positioning handle is connected to the welding gun and extends through the side wall of the lower chamber to facilitate manipulation of the gun. To effect the welding, the platen with the workpiece is moved relative to the stationary housing, the gun is manipulated, and the welding is thereby effected.

16 Claims, 4 Drawing Figures

3,905,234

UNDERWATER WELDING TEST CHAMBER

BACKGROUND OF THE INVENTION

This invention relates to an underwater welding test chamber and, more particularly, to a test chamber capable of simulating underwater conditions for testing welding apparatus.

There is described in U.S. Pat. No. 3,794,804 issued Feb. 26, 1974 to Ernest H. Berghof a handheld, portable welding housing for underwater welding. The housing has a side aperture therein through which at least a portion of a welding gun is introduced. The housing also has a welding aperture which is placed against a workpiece so that welding may be effected therethrough. Shielding gas is introduced into the housing to purge it of water. The welding operation is viewed through a window in the housing which is in direct visual alignment with the welding aperture.

While this housing has been found effective and efficient in performing underwater welding jobs, it is extremely difficult to test this and similar underwater housings and to develop suitable shielding gas mixtures and related welding apparatus for the various depths. In each instance, the housing must be taken down by a diver, tested and then returned to the surface. As is well known, it takes considerable time for the diver to be prepared, lowered into the water, perform the test and return to the surface. Not only is this procedure time consuming, it is also expensive and potentially dangerous. Furthermore, the time during which the diver can spend underwater at the greater depths is severely limited.

In testing different housing designs and different gun designs for use underwater, again it is extremely difficult for the diver to effect the assembly and reassembly of the components at an underwater site to effect the various needed tests.

It is, therefore, an object of this invention to provide an improved apparatus for effecting the testing of underwater welding devices and techniques.

Another object of this invention is to provide a test chamber capable of testing underwater welding devices in different simulated underwater conditions.

BRIEF DESCRIPTION OF THE INVENTION

According to this invention apparatus is provided for testing an underwater welding device. The welding device to be tested is a hand portable housing incorporating a welding aperture, a viewing window opposite the aperture, gas means for purging the housing of water with a shielding gas and means for introducing a welding gun into the housing for effecting welding of the workpiece through the welding aperture. The apparatus of this invention comprises means defining upper and lower interconnected regions for containing respective gas and water volumes, means for supplying water to the lower region, positionable support means disposed in said lower region for positioning the workpiece, means defining a viewing plate in the wall of said lower region, positioning means for positioning said housing between said viewing plate and said workpiece with the viewing window of the housing contiguous the viewing plate and the welding aperture contiguous the workpiece, and control means for varying the shielding gas exhausted from said upper region, thereby to simulate underwater pressure at various depths.

Preferably the regions are separate chambers. In a preferred embodiment of the invention the positioning means includes a resilient means for urging the welding aperture against the workpiece and includes an adaptor means for shielding the space between the viewing window and the viewing plate thereby to preclude the admission of gas bubbles between the viewing plate window. There is also provided a means for positioning the welding gun located within the lower chamber from without the chamber and viewing the weld in progress in the same manner as in an actual underwater operation.

BRIEF DESCRIPTION OF THE DRAWINGS

The novel features that are considered characteristic of this invention are set forth with particularity in the appended claims. The invention, itself, however, both as to its organization and method as well as additional objects and advantages thereof will best be understood from the following description when read in connection with the accompanying drawings in which:

DETAILED DESCRIPTION OF THE INVENTION

Figure 1:
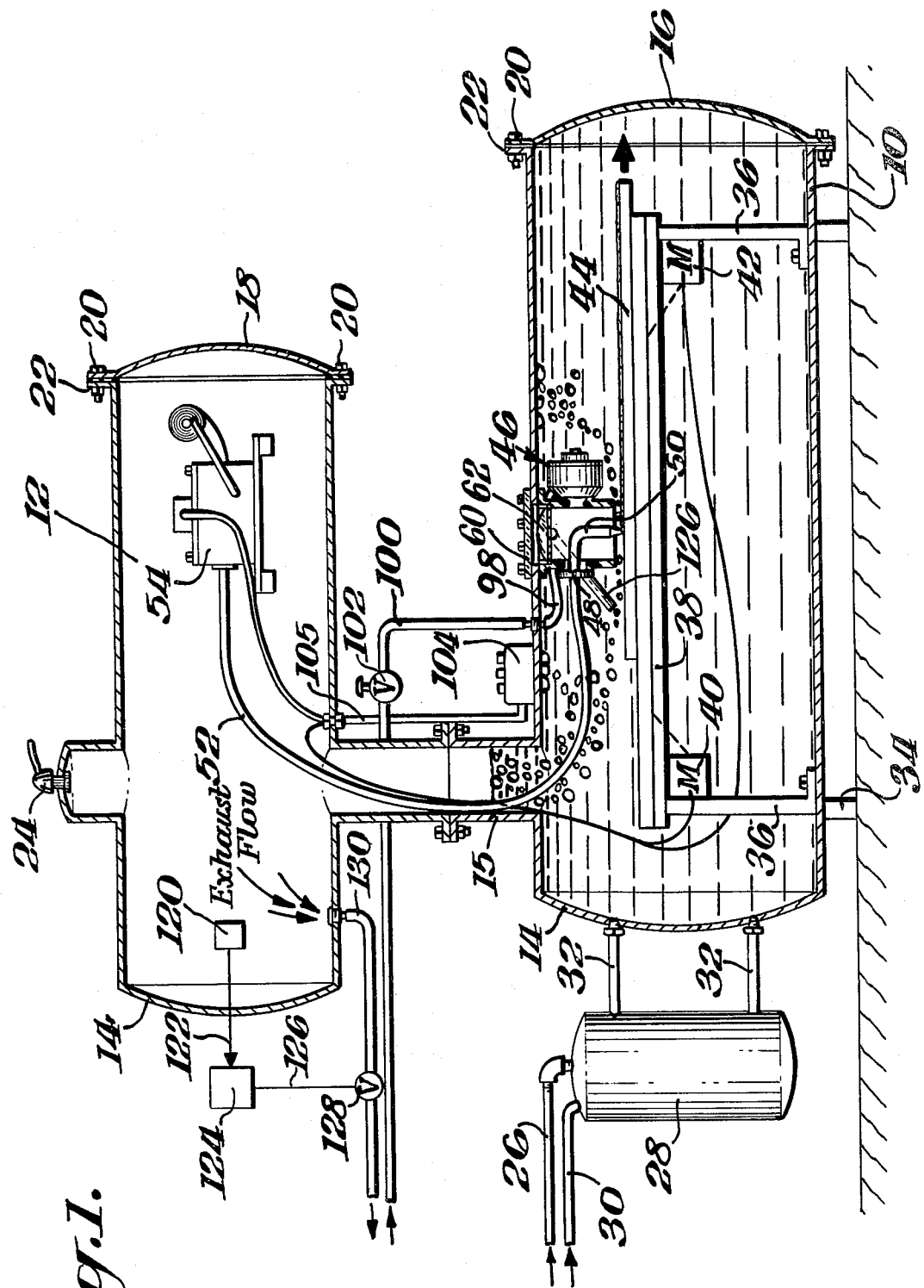
FIG. 1 is a cross-sectional elevational view of a preferred form of the apparatus constructed in accordance with this invention.

There may be seen in FIG. 1 the basic elements which make up the apparatus of this invention. These elements include a lower chamber 10 which is filled with water as will be described and an upper chamber 12 which is filled with shielding gas exhausted from the lower chamber as will be described. These chambers 10 and 12 preferably are generally cylindrical and formed of any suitable material, such as steel, capable of withstanding the pressures desired. Both have one end section which is hemispherical and fixed (the lefthand side in the drawing) and a removable end section 16 and 18, respectively. The removable end sections 16 and 18 are secured as by bolts 20 coupled to flanges 22 formed at the ends of the chambers 10 and 12. Suitable gasketing material (not shown) may be employed as desired to seal the end section. A pressure release valve 24 may be mounted in the side wall of the upper chamber 12.

Water is supplied to the lower chamber 10 from a supply source 26. Water from the source 26 is passed through a heat exchange unit 28 of conventional type for heating and cooling as desired. In a typical instance, the water will be cooled to compensate for the welding heat, hence, a refrigerant will be supplied to the heat exchange unit 28 through the line 30. Any suitable refrigerant may be used such as freon or amonia from a conventional refrigerating system. In similar manner electric heaters may be used to heat the water if desired. The heat exchange unit 28 may include a water pump (not shown) to circulate the water within the tank 10 through the inlet and outlet conduits 32 connected to the end section of the lower chamber 10.

The lower chamber 10 may be mounted in a suitable cradle 34 of conventional design. Within the lower chamber 10 a pair of supports 36 are secured as by welding. These supports 36 hold a movable platen 38 which may be positioned in each of two perpendicular directions (the X and Y directions) within a horizontal plane as by a Y positioning motor 40 and an X positioning motor 42. These motors 40 and 42 may be mounted on the supports 36.

In an alternative method of this invention not shown, the platen may be positioned in a vertical or other angled plane to accommodate different weld positions as desired. To this end the platen may be made to be adjustable.

The platen 38 is adapted to grip by any suitable means (not shown) such as a clamp, a workpiece 44 to be welded. A welding housing 46 constructed in accordance with the teachings of the said Berghof patent or any other suitable underwater welding, handheld, housing is adapted to be positioned on top of the workpiece to permit the workpiece to be moved in a horizontal plane relative thereto while the housing 46 rides or "floats" thereover. As described in said Berghof patent, the housing 46 may be of a suitable plastic and generally cylindrical in shape and have a flexible sealing gasket 48 for accommodating at least the end portion of a welding gun 50. Wire is fed through the welding gun 50 and a suitable conduit 52 from a wire feed unit 54 of conventional design, which may be attached to the wall, as by welding, of the upper chamber 12. In the alternative, a stick electrode may be used and fed directly through the flexible gasket 48 into the welding chamber to effect the welding. An outlet or vent tube 126 communicating with the interior of the housing facilitates purging the water from the housing. This vent tube is positionable thereby to control the pressure in the house as described by Berghof.

Figure 2:
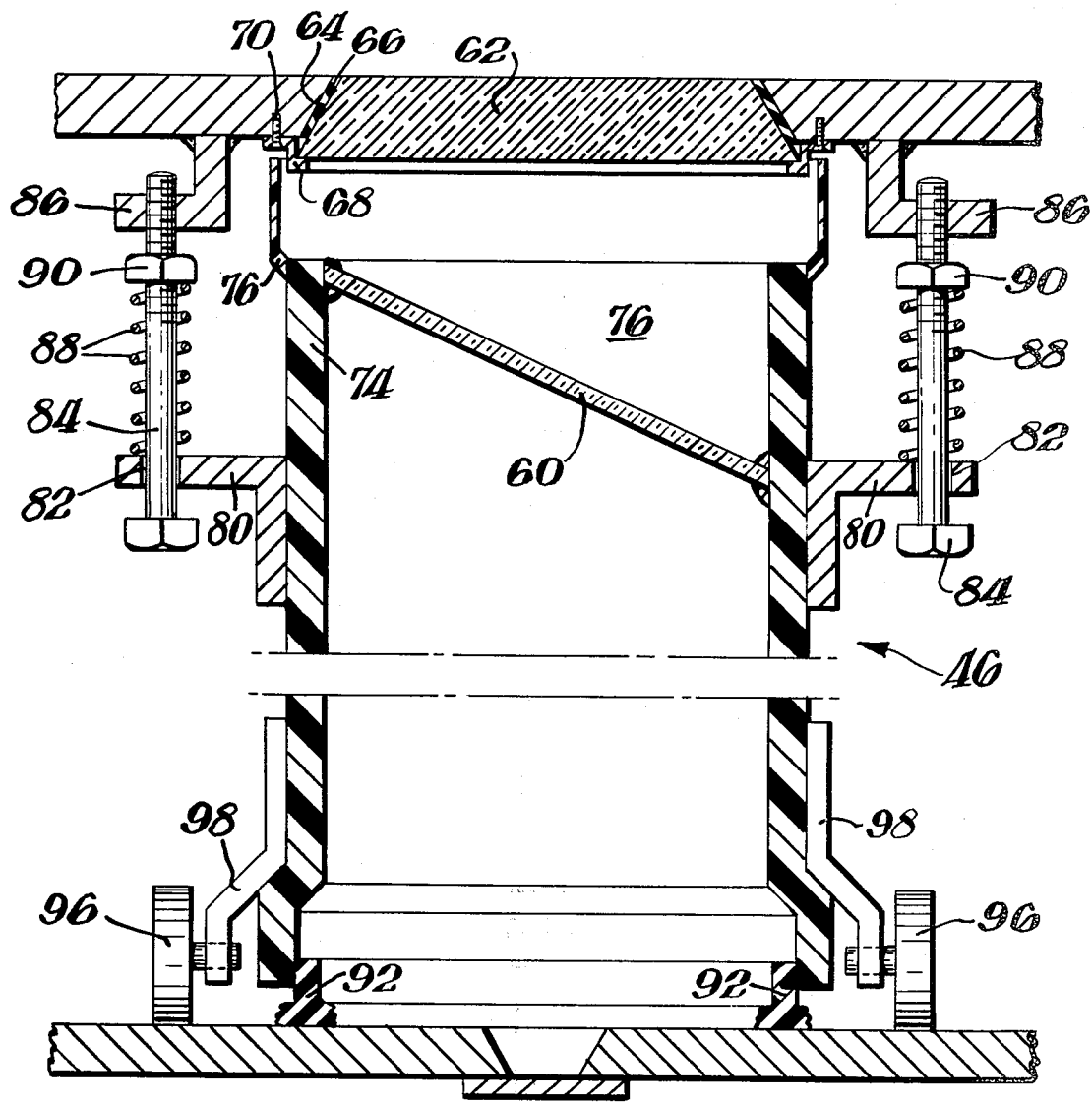
FIG. 2 is a cross-sectional elevation view of the housing for the welding gun particularly depicting the manner in which the housing is mounted to the side wall of the lower welding chamber illustrated in FIG. 1.

The housing 46 also has a viewing window 60 at the upper end thereof to permit the weld area of the workpiece to be viewed by the user. In this instance, the viewing window 60 and the housing 46 are positioned such that the axis of the housing intersects a viewing aperture 62 formed in the side wall of the lower chamber 10. This viewing aperture may be closed by a suitable glass plate of sufficient thickness to withstand the pressures to be used and may have bevelled peripheral portions 64 (FIG. 2) such that the pressure of the water will force the viewing plate more tightly against an annular sealing gasket 66, thereby improving the seal with increasing pressures. The viewing plate 62 is retained in position by a retaining ring 68 which is secured as by screws 70 to the inner side wall of the lower chamber 10. The upper end 74 of the cylindrical portion of the housing has a flared adaptor ring 76 secured thereto, as by appropriate cement, for example, and is formed of a sufficient diameter at the flared portion so as to clear the retaining ring 68 and fit loosely thereover and thereby provide a skirt or apron which surrounds the retaining ring and viewing port 62 and prevents the entry of gas bubbles of the shielding gas from entering into the line of sight of the user. The loose fitting is retained such that water may enter into the gap region 78 between the viewing port 62 and the viewing plate 60 and thereby more closely duplicate the view underwater seen by the welder. Three or more (two are illustrated for the sake of simplicity) slide brackets 80 are attached as by suitable cement to the cylindrical side of the housing 46. These brackets are L-shaped and have holes 82 formed in the upwardly extending portion of sufficient diameter to accommodate bolts 84 which are threadedly engaged in mounting brackets 86. The mounting brackets 86 are secured as by welding to the side wall of the test chamber. A compression spring 88 is slid over the bolt 84 to engage the upper surface of the brackets 80 and be compressed by a nut 90 secured to the end portion of the bolt. Hence, by adjustment of the nut 90, the compression of the spring 88 may be increased or decreased. The function of this spring is to urge the housing 46 inwardly (away from the wall of the chamber) against the workpiece.

As is taught in the said Berghof patent, the lower end of the housing preferably has gasketing material 92 secured thereto. It is this gasketing material 92 which actually engages and contacts the workpiece to insure mobility and freedom of movement of the workpiece relative to the fixed housing 46, thereby duplicating the contact between the housing and workpiece.

Suitable coaster or ball-type wheels 96 may be secured as by a wheel bracket 98 to the side walls of the housing 46. The number of wheels and wheel brackets employed preferably will be the same number as the slide brackets 80 and they will be positioned at corresponding points about the periphery of the welding housing. These wheel brackets may be adjustable if desired and are such as to maintain a precise, predetermined spacing between the housing and the workpiece and thereby prevent the application of too much pressure to the contact gaskets 92 as when handheld. The ball-type coasters permit universal movement along the horizontal plane of the workpiece relative to the housing with little or no friction. This movement is enhanced or lubricated by the escaping bubbles about or through the contact gasket as is more fully described in the said Berghof patent.

A shielding gas inlet (not shown in FIG. 2, but illustrated generally in FIG. 1) is provided for the housing. This inlet may permit diffusion of the shielding gas into the housing or may introduce the gas directly into the housing. This inlet is connected through the side wall of the lower chamber 10 through a suitable conduit 100 and valve 102 to a supply of shielding gas (not shown). Any suitable shielding gas as is described in said Berghof patent may be used. These shielding gases include argon, carbon dioxide and any of the other well known shielding gases used in welding or mixtures thereof. Suitable known means for mixing and varying the ratios of the gases are provided.

A weld and position control unit 104 is mounted to the top of the lower chamber 10 and connected through suitable wires 105 to control the wire feed unit 54 in the upper chamber 12 and to control the positioning motors 40 and 42. Any suitable control means may be provided such as push button switches and the like. Alternatively, a positioning joy stick may be used to simultaneously control both motors in a well known manner. A switch is also included to control the application of the welding current which is supplied to the wire feed unit from a suitable welding power supply (not shown).

A workpiece to be test welded can be introduced onto the platen 38 through the removable end section 16 of the lower chamber and attached to the platen 38 by a suitable clamp or other holding device. Also, the welding gun is introduced through the gasket 48 in the side of the housing. The welding gun itself is remotely manipulated as by a handle 110 (seen most clearly in FIG. 3) which is introduced through a universal or ball joint 102 in the upper portion of the lower chamber 10. The handle 110 has an arm 104 which is axially slidable within the ball joint 102, the ball joint itself being rotatable within a socket 106 mounted in the side wall of the lower chamber 10. A suitable O-ring seal (which is not shown) is provided within the ball joint 102 to permit the axial movement of the arm 104. The end of the arm 104 has a clamp 108 which grips the welding gun 50 thereby to permit the gun to be moved from without the chamber in the same manner as would a handheld gun. The upper chamber is provided with a pressure sensor 120 of conventional design which is connected by suitable wire 122 to a pressure controller 124 also of conventional design. This controller 124 operates through a mechanical linkage 126 to control a solenoid valve 128 which controls the exhaust flow of shielding and exhaust gases from the upper chamber. The unit is now ready for use.

In operation the end section 16 is removed and a workpiece mounted on the platen and clamped. The welding gun is introduced through the flexible gasket in the housing 46 and clamp 108 attached thereto. The end section 16 is now replaced and bolted and water supplied to the lower section through the conduit 26. Water is filled until the lower chamber is completely filled and water has risen just up into the interconnecting passage 15.

The valve 128 is opened and shielding gas caused to flow into the housing 46 to purge water therefrom. Valve 128 has the same function as the control valve of the Berghof patent, i.e., to maintain water out of the housing. As the bubbles from the shielding gas escape from the housing 46 about the contact gasket 92 and through the exhaust port and vent tube of the housing 46, they gravitate upward into the interconnecting passage 15 and thence into the upper chamber 12, increasing the pressure of both the chambers. The shielding gas is allowed to continue to flow until the pressure in the two chambers reaches the desired level. This exhaust flow of shielding gas will pass out through the exhaust line 130. By adjustment of the controller 124 and increasing or decreasing the valving action on the exhaust line, the pressure of the shielding gas building up in the upper chamber 12 may be increased or decreased, thereby controlling the water pressure in the lower chamber 10 to simulate any desired underwater operating temperature and/or pressure (or depth).

Tests may now begin. The user positions himself over the tank and by operating the various controls in the control unit 104 is able to actuate the wire feed unit 54 to cause the welding electrode to be fed through the gun 50. Now by energizing the welding current and manipulation of the handle 110, the welding gun may be manipulated or positioned relative to the workpiece and the welding initiated. By controlling the positioning motors 40 and 42, the workpiece is now moved to the left or right in the drawing or back and forth relative to the housing 46. Prior adjustment of the compression spring 88 applies the proper tension as it maintains the housing in floating contact with the workpiece 44 as the welding progresses.

In an alternative embodiment, the upper chamber 12 in the form of a separate tank may be omitted and the interconnecting passage 15 simply used as the upper chamber. In this instance the welding lines, electrical control lines and gas outlet line would all be attached at this point. Further, the wire feed unit would be exposed to the outside atmosphere. In many cases this is an undesirable feature inasmuch as it would not be subjected to the identical conditions as the rest of the system. It also would pose somewhat of a leakage problem. It is for this reason that the preferred embodiment illustrated in FIG. 1 using the upper chamber is preferred. Its size, of course, may be varied.

In still another alternative embodiment, even the interconnecting passage may be omitted and the gas allowed to collect in the upper regions of the lower tank. So long as the viewing plate is below the water level, the lower tank itself may be used to perform the functions of both the upper and lower tanks. The connecting lines are simply connected to the upper portion of the tank.

Figure 3:
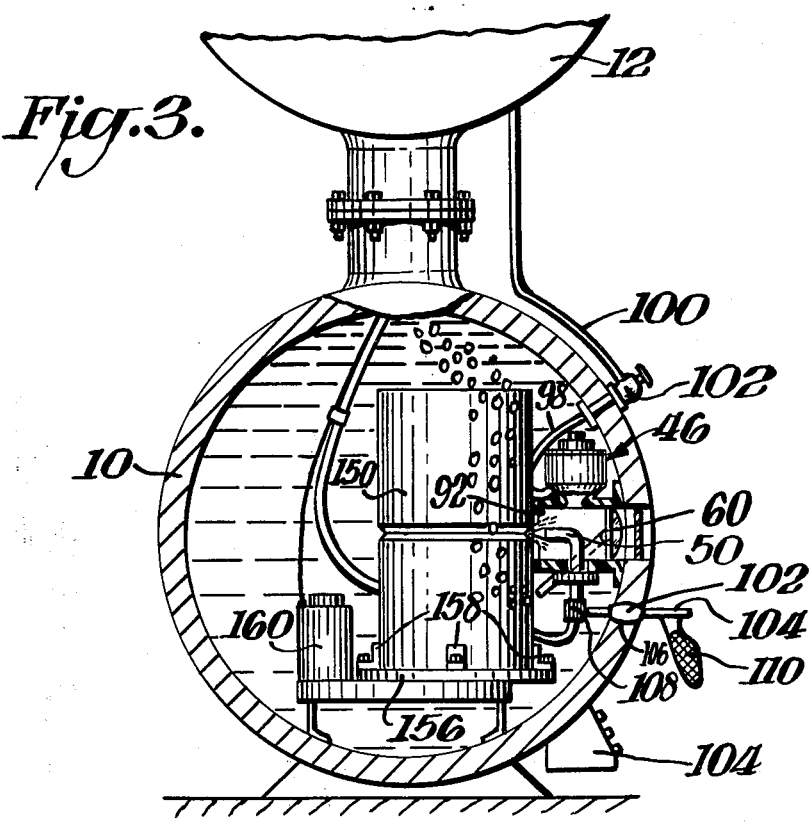
FIG. 3 is an end elevation view of a portion of the lower tank depicted in FIG. 1 illustrating another embodiment of this invention in which the housing is positioned horizontally to effect welding on a side wall.

In FIG. 3 there is shown another embodiment of this invention. In this instance the application is to provide a test environment in which a vertically disposed pipe section 150 may be test welded. The construction of this test chamber is essentially the same as previously described. The only difference is that the viewing port or window 62 of FIG. 1 is relocated in the embodiment of FIG. 3 to a position on the side of the lower chamber 10. Also, instead of utilizing the horizontally disposed platen 38, which is movable in an X-Y direction in the horizontal plane as disclosed in FIG. 1, in this instance a rotating platen 156 is used. The platen 156 is in a horizontal plane but is permitted to rotate in that plane about an axis perpendicular to the plane. The platen 156 has clamps 158 which may be used to clamp the pipe section 150 to the platen 156. A motor 160 may be connected through a suitable transmission or chain drive to rotate the platen 156. With this simple description, the remainder of the components employed in the test chamber are substantially as described previously in connection with FIG. 1

In operation, the workpiece 150 in the form of the cylindrical pipe section is clamped by the clamps 158 on the platen 156. The chamber end section is sealed and the chamber filled with water as before. When the motor is started in this instance, of course, the workpiece is rotated relative to the gun and the welding may proceed as before. It may be noted that the contact gasket 92 will have a curvature to correspond to that of the curvature of the surface of the pipe section as is described in the said Berghof patent.

Figure 4:
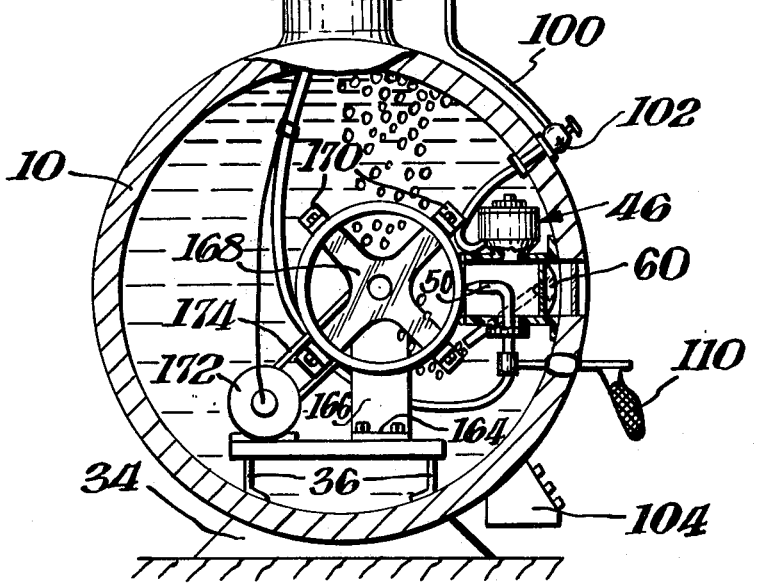
FIG. 4 is an end elevation view of the lower chamber depicting still another alternative embodiment of this invention in which the workpiece is positioned horizontally and is rotatable about a horizontal axis.

Still another embodiment of the invention is depicted in the drawing of FIG. 4. In this drawing, all of the elements are substantially the same as previously described except for the manner in which the workpiece is to be mounted. Thus, in the illustration of FIG. 4, the welding is to be performed upon a pipe section horizontally disposed. for this purpose, the support 36 is an L-shaped platform 164 having an upright 166 to which a rotatable platen 168 is rotatably secured. Clamps 170 on the rotatable platen 168 facilitate the mounting of the pipe section. In this instance, the platen 168 is in the form of a crosspiece with the clamps 170 at the end portion of each of the arms of the cross. A motor 172 operates through a pulley 174 to drive the pipe section in a manner such that it rotates about its horizontal axis.

In operation, this is substantially the same as previously described. The only difference in this case lies in the positioning of the workpiece.

There has thus been described a rather unique test chamber that may be used to test small portable underwater welding devices. The chamber permits the simulation of great depths underwater by the control of the exhaust flow of the shielding gas derived from the welding operation. Great economies are available by the utilization of this invention.

It is obvious that many embodiments may be made of this inventive concept and that many modifications may be made in the embodiments hereinbefore described. Therefore, it is to be understood that all descriptive material herein is to be interpreted merely as illustrative, exemplary and not in a limited sense. It is intended that various modifications which might readily suggest themselves to those skilled in the art be covered by the following claims, as far as the prior art permits.

What is claimed is:

1. Apparatus for testing an underwater welding device, said device having a hand portable housing incorporating a welding aperture, a viewing window opposite said aperture, gas means for purging said housing of water with a shielding gas, and means for introducing a welding gun into said housing for effecting welding of a workpiece through said welding aperture, said apparatus comprising, in combination:

means defining upper and lower interconnected regions for containing respective gas and water volumes, means for supplying water to said lower region, adjustable support means disposed in said lower region for supporting said workpiece;

means defining a viewing plate in the wall of said lower region, mounting means for mounting said housing within said lower region between said viewing plate and said workpiece with the viewing window contiguous said viewing plate and the welding aperture contiguous said workpiece, and control means for varying the exhaust of shielding gas from said upper region, thereby to simulate the water pressure at various depths in said lower region.

2. Apparatus according to claim 1 wherein said regions are separate chambers.

3. An apparatus according to claim 2 wherein said control means includes:

a pressure sensor disposed in said upper chamber, and means responsive to said pressure sensor for varying the flow of gas exhausted from said upper chamber.

4. An apparatus according to claim 2 which also includes means for supplying shielding gas to said gas means in said lower chamber.

5. An apparatus according to claim 2 which also includes means for controlling the temperature of the water supplied to said lower chamber.

6. An apparatus according to claim 2 wherein said mounting means includes a spring means for urging said welding aperture against said workpiece.

7. An apparatus according to claim 6 wherein said positioning means includes a deflector adaptor means for shielding the space between said viewing window and viewing plate thereby to preclude the admission of gas bubbles and yet to admit water thereto.

8. An apparatus according to claim 7 wherein said positioning means includes support means for maintaining a predetermined spacing between said workpiece and said housing.

9. An apparatus according to claim 2 wherein said mounting means includes a deflector adaptor means for shielding the space between said viewing window and viewing plate, thereby to preclude the admission of gas bubbles and yet to admit water thereto.

10. An apparatus according to claim 2 wherein said positioning means includes means for maintaining a predetermined spacing between said workpiece and said housing.

11. An apparatus according to claim 2 wherein said adjustable support means is adapted to rotate said workpiece about an axis.

12. An apparatus according to claim 11 which includes remote means for positioning said welding gun within said lower chamber from without said chamber.

13. An apparatus according to claim 11 wherein said axis is horizontal.

14. An apparatus according to claim 11 wherein said axis is vertical.

15. An apparatus according to claim 2 which includes remote means for positioning said welding gun within said lower chamber from without said chamber.

16. An apparatus according to claim 2 wherein a feed unit for said welding gun is disposed within said upper chamber.

* * * * *